United States Patent
Dukich et al.

[11] 4,051,534
[45] Sept. 27, 1977

[54] HEAD ATTACHED TELEVISION

[75] Inventors: Peter P. Dukich, Blaine; Isaac W. Metzger, Robbinsdale; John A. Volk, West St. Paul, all of Minn.

[73] Assignee: Honeywell Inc., Minneapolis, Minn.

[21] Appl. No.: 735,934

[22] Filed: Oct. 27, 1976

[51] Int. Cl.² .................................................. H04N 5/30
[52] U.S. Cl. ........................................ 358/210; 358/93
[58] Field of Search .................. 358/93, 98, 100, 108, 358/185, 209, 210, 217

[56] References Cited

U.S. PATENT DOCUMENTS

| | | | |
|---|---|---|---|
| 2,675,462 | 4/1954 | Newton | 358/185 |
| 3,891,842 | 6/1975 | Strusinski | 358/185 |
| 3,919,475 | 11/1975 | Dukich et al. | 358/210 |
| 3,944,738 | 3/1976 | Johnson | 358/93 |

*Primary Examiner* — Richard Murray
*Attorney, Agent, or Firm* — Charles G. Mersereau

[57] ABSTRACT

An improved, self-contained, remotely controlled color television system is disclosed. The system utilizes a small head mounted television camera which is adapted to transmit a picture of the operations carried on by the wearer of the camera to be remotely viewed and/or recorded by a third party. The focusing and aiming of the camera is remotely controlled from a console equipped with controls and a television monitor. An illumination system is provided which utilizes a dual beam, the convergence and elevation of which is controlled by the wearer. The illumination is fixed to the head mounting so as to follow the head movements of the wearer. The dual beam of the illumination system enables the area desired to be illuminated by the wearer to be so illuminated virtually without shadows and without interference to his field of view. The video image reproduced by the system is of a high quality which makes it quite useful for teaching and demonstrating such things as delicate surgical procedures of the type often found in dental, abdominal, cardiovascular and neurosurgery. Control of the illuminaton system by the wearer enables him to work without distraction caused by remote control of the illumination system. A second stationary mounted camera may be added to this system to provide additional coverage.

4 Claims, 7 Drawing Figures

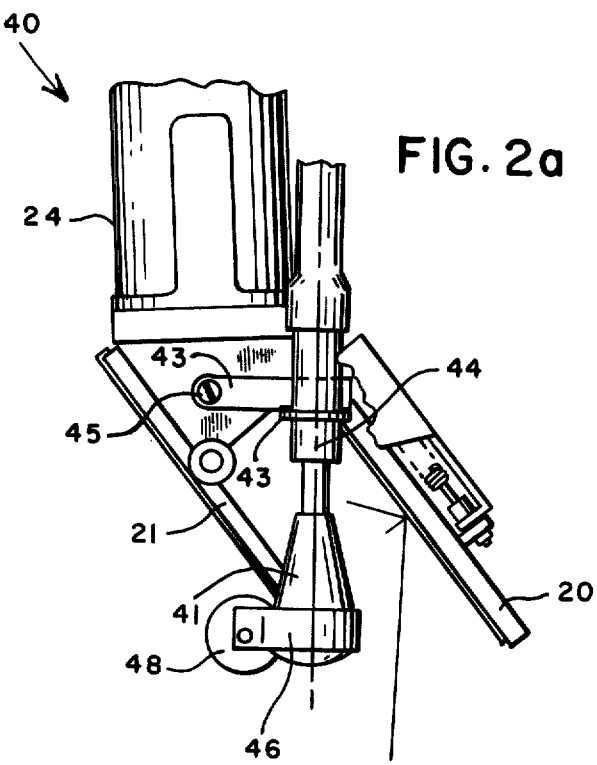
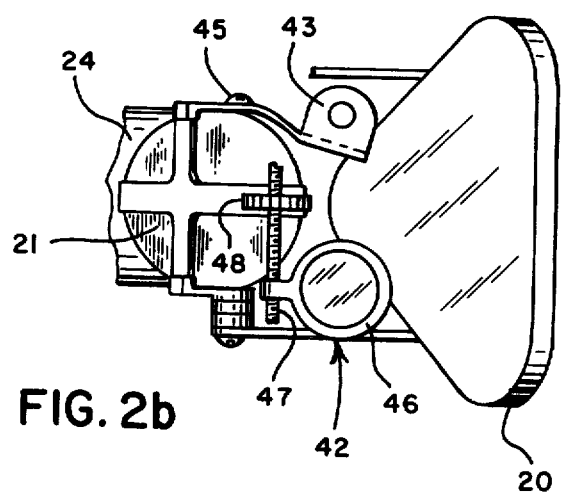

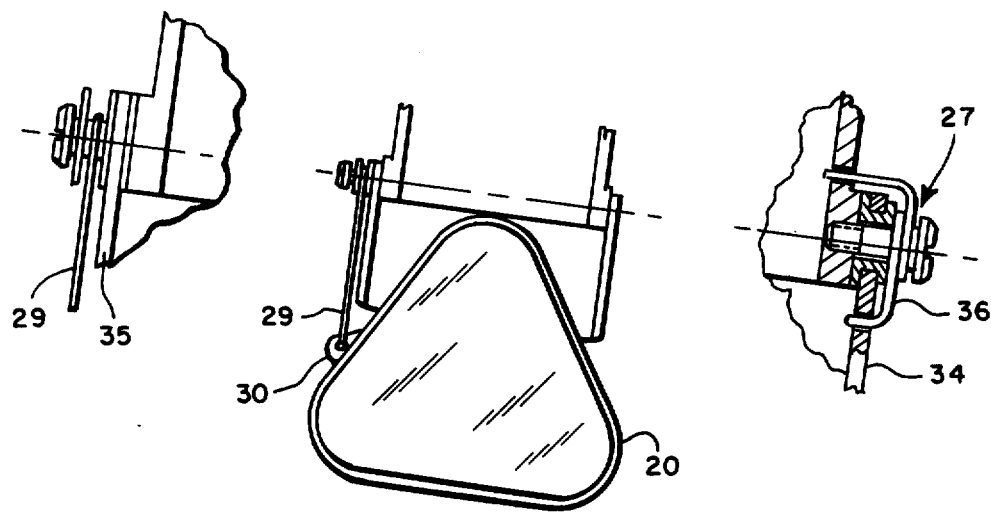
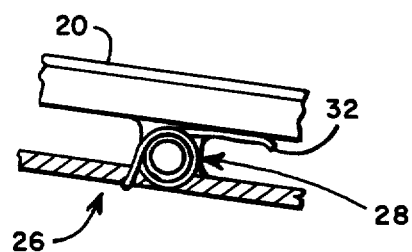
FIG. 3

HEAD ATTACHED TELEVISION

BACKGROUND OF THE INVENTION

1. Field of the Invention

This invention relates generally to a method and apparatus for remotely observing manual manipulations and, more particularly, to a remotely controlled television system operating in conjunction with a locally controlled illumination system for observing such manual operations as surgery.

2. Description of the Prior Art

In the prior art serveral techniques have been utilized to mount cameras in a fashion which allows them to follow the head movement of an individual in an attempt to synchronize the field of view of the camera with the field of view of the individual involved. These include attempts to produce video and film photograph of such intricate manual manipulations as surgical procedures and the like. One commonly used method for viewing surgical operations involves the use of one or more dolly-mounted cameras (including operators) and/or overhead-mounted remotely aimed and controlled cameras.

The use of a head-mounted camera system is also shown by the prior art. A device of this nature is illustrated and described in a patent to P. P Dukich, R. L. LeChevalier and J. A. Volk (both Dukich and Volk are co-inventors in the present application) U.S. Pat. No. 3,919,475 issued Nov. 11, 1975 and assigned to the same assignee as the present invention. By that invention there is described a head-mounted camera system which includes remotely controlled focusing and aiming optics and a remotely aimed illumination system. The camera, optical focus, line of sight, plus all video control including monitoring and recording (if desired) and operated by a single operator at a remote control console which may be located outside the work area. The illumination system of that invention includes a cold illumination system (having separate sources such as fiber optic optical bundles) which are ridgedly attached to the head-attached camera unit. The mounting of the illuminators is such that both are bore-sighted to the camera line of sight so that the illumination system illuminates subject matter coincident with the field of view of the camera system. Thus, the location lighted by the illumination system is also controlled remotely with the aiming of the camera.

While that system has been successfully used in the past to produce excellent video results, it does suffer from certain limitations. Whereas the bore-sighted illumination system operated in conjunction with the remote focusing and aiming systems presents an advantage to the remote operator of the television camera system, the remote aiming of the illumination system has been found to interfere with the work of the surgeon or other wearer of the head-attached television system. A wearer accustomed to wearing a standard head-mounted illuminator such as is typiclly worn by surgeons tends to steer the light field to suit his needs by rotating and/or nodding his head slightly. When such a wearer uses a head-attached television, he likewise attempts to steer the light field by moving his head. The remote operator or controller of the head-attached television system, however, is at the same time attempting to remotely controlling the field of view of the camera and with it the light field. The position of the light desired by the surgeon and the remote controller often do not coincide. In fact, they may often be at odds. The wearer, although unconcerned with the remote camera operation, moves his head to center the light field as he desires. This also shifts the camera field of view and the remote controller reacts to recenter the camera field which also shifts the light field. This cycle may continue until the limit of remote adjustment is reached at which point the wearer can control the location of the illumination field. However, he generally will have to hold his head in an unusual and/or uncomfortable position and the remote operator is no longer able to properly center the action in the camera field of view.

SUMMARY OF THE INVENTION

By means of the present invention, the problems associated with remote control of the precise light field of the illumination system are solved by the provision of an improved illumination system for a head-attached television. The improved system eliminates motion of the illuminated field relative to the location determined by the position of the head of the wearer. Certain manual adjustments are provided such that the area illuminated and the relative elevational position of the illuminator to the head of the wearer may be adjusted to suit the individual wearer. Whereas the remote television camera operator no longer directly controls the field of illumination, he still controls the fine field of view and focus of the camera system.

The improved illumination system includes a pair of separate illuminators mounted through brackets which are ridgedly attached to the head unit and sighted generally along the line of sight of the wearer. A thumbwheel operated, threaded convergence adjustment is provided to vary the alignment of the illuminators by flexure of the mounting brackets. Elevation is varied by changing angle of fixation of the brackets to the head unit. This enables one head-mounted system to accommodate a variety of operators and different working conditions.

The basic remote viewing system includes the head-mounted unit, an auxiliary operating room (OR) unit and a remote control console. The head-mounted unit is equipped with pick-up devices, which normally include a light weight miniaturized color television camera and associated video-audio transmission systems, an optical sub-system of lenses and mirrors mounted in a manner which does not obstruct the vision or field of view of the wearer, the illumination system (including separate sources such as flexible fiber optical bundles) and remote control activator subassemblies. The auxiliary (OR) unit provides primary and alternate light sources for the cold illumination system plus certain electronic circuitry for the head-mounted unit. A control sub-system contained in a remote console but connected electrically to the head-mounted unit via the auxiliary (OR) unit is provided which contains video and, if desired, audio monitors, controls to command remote focus and aiming functions of the camera system, any video or audio switching desired and/or a video tape recorder. A single operator may aim and focus the camera in response to real-time observations on the video monitor and control the video tape recorder.

BRIEF DESCRIPTION OF THE DRAWINGS

In the drawings wherein like numerals are utilized to depict like parts throughout the same:

FIG. 2a is a partial enlarged side view showing the mounting of the illumination system of the invention;

FIG. 2b is an enlarged front view, with parts cutaway, showing the mounting of the illumination system of the invention;

FIG. 3 is a detached enlarged view of the camera aiming mirror depicted to show the operation thereof;

DESCRIPTION OF THE ILLUSTRATIVE EMBODIMENT

Figure 1:
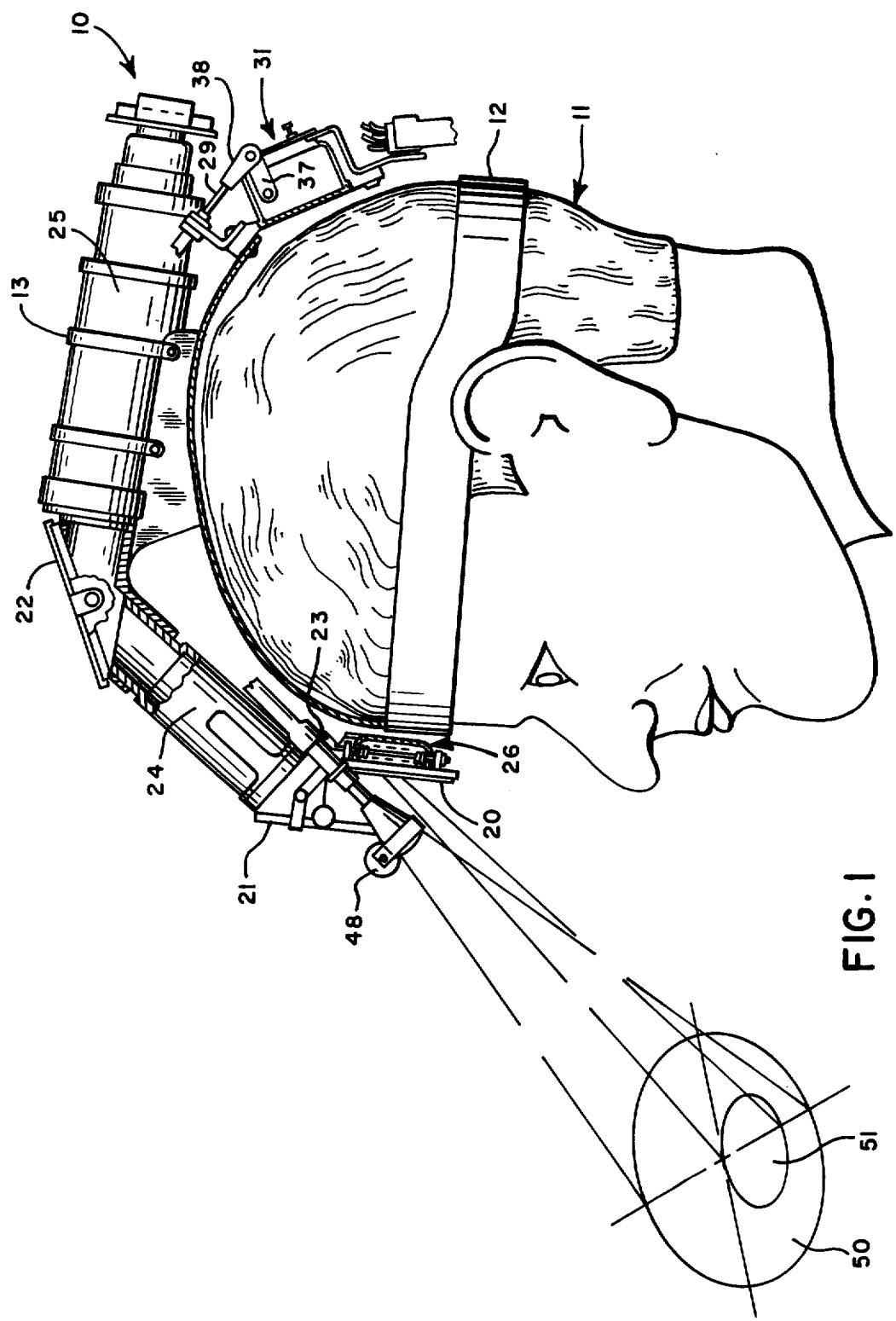
FIG. 1 is a profile view of the head-mounted unit with the unit enclosure cut-away to show the internal workings of the system.

In FIG. 1 of the drawings, we see a representation profile of the head-mounted unit of the invention in place on the head of a wearer. The outer unit enclosure has been removed to expose the inner workings of the head-mounted unit. The unit generally depicted by 10 is typically attached to head 11 as by a headband 12 although it may also be designed to be integral with a helmet-type of head gear. The sub-systems located in the head-mounted unit of the illustrative embodiment, discussed in greater detail below, include an optical sub-system which comprises lens and mirrors plus their associated mounting structures for aiming and focusing the television camera, a television camera sub-system which includes video and audio systems and the independent illumination sub-system. In the head-attached unit these systems are integrally mounted in a light weight compact coordinated package.

The basic optical system is shown in FIG. 1 and in the optical schematic diagram of FIG. 4. The system consists basically of mirrors 20, 21 and 22 and camera lens 23(FIG. 4). Tubular sections 24 and 25 form an enclosed optical path from the mirror 21 to the camera section at 13. Mirrors 21 and 22 are mounted in a stationary position such that an image reflected from mirror 20 onto the mirror 21 follows a bore-sighted path from that point into the television camera.

In the illustrative embodiment the mirror 20 is mounted so that it may be pivoted about a vertical pivot assembly, shown generally at 26, to control the horizontal deflection or yaw of the field of view of the camera. Horizontally disposed pivot mounting shown generally at 27, (FIG. 3) controls the pitch or vertical attitude of the mirror and thus the field of view of the camera.

FIG. 3 depicts an enlarged view of the mirror 20 of FIG. 1 along with enlarged details of a method of pivotally mounting the mirror 20. Thus, the yaw control of the vertical mounted pivot 26 consists of conventional top and bottom pivot joints one of which is shown at 28. A control wire 29 attached at one end to an ear 30 on the mirror 20 and at the other end to an electro mechanical servo system, like that shown at 31(FIG. 1), is utilized to position the yaw angle of the mirror 20. Return springs on the pivotal joints, one of which is shown at 32, cause the yaw adjustment to return in the opposite direction as the tension and wire 29 is decreased by reverse operation of the servo system 31.

In a like manner, adjustment of the pitch or vertical attitude of the mirror is accomplished by tension on a control wire attached to the mirror vertical pivot as at 33 (FIG. 1). The mirror pivot, in turn, is attached to a mounting bracket which has two mounting arms 34 and 35 (FIG. 3) which are mounted in conventional fashion to form the horizontal pivot joints of the horizontally disposed pivot 27 which allows variation in the pitch or vertical alignment of the mirror 20. Again, a return spring, depicted at 36, is utilized to return mirror 20 toward the fullest forward (uplooking) position as the tension on the corresponding control wire is decreased.

The second servo motor involved in the positioning of the mirror 20 may be identical to that illustrated at 31 (FIG. 1). Thus, by remote electrical control the servo motors are used to operate bell cranks or eccentrics as at 37 which cooperate with pivotal sleeves 38 to position the mirror 20 by reciprocating the tension control wires as at 29. A similar electro mechanical servo system, not shown, is used to remotely position the TV camera lens, shown in the optical diagrams of FIGS. 4a and 4b, at 23, by axially adjusting its position relative to the TV camera itself in a well known photographic focusing manner. The servo systems themselves may be, for example, CPS-12 servos available from Kraft Systems Inc., Vista, California.

The details of the improved illumination system of the present invention can best be seen in the enlarged fragmentary views of FIGS. 2a and 2b. It includes dual separate illuminators 41 and 42 which are ridgedly attached through respective mounting brackets as at 43 and secured therein as by holddown collars 44. The brackets 43 are in turn secured to the tubular member 24 as by conventional screws 45.

Elevational adjustment of the illuminators 41 and 42 maybe accomplished by rotating the bracket member 43 about the fastener 45 and tighting at the desired attitude. The dual illuminators 41 and 42 are interconnected by collars 46 attached to the illuminators which, in turn, are threadably attached to a common convergence adjustment screw 47. The convergence adjustment screw 47 is operated by a thumb wheel 48 through which it is nonrotatably mounted. The brackets 43 are flexible in the direction of the axis of the convergence screw 47 such that operation of the thumb wheel 48 flexes the brackets and causes the desired convergence or divergence of the beams emanating from the illuminators 41 and 42.

The mounting of the illumination system of the present invention, then, is such that the field of view illuminated follows the movement of the head of the wearer. Thus, the wearer can by means of the above-described adjustments adjust both the relative elevation of the beam to the desired position and the convergence or divergence of the beams from the illuminators 41 and 42. The convergence adjustment allows him to eliminate shadows in the field of view and achieve better sight into the area of work.

Figure 4B:
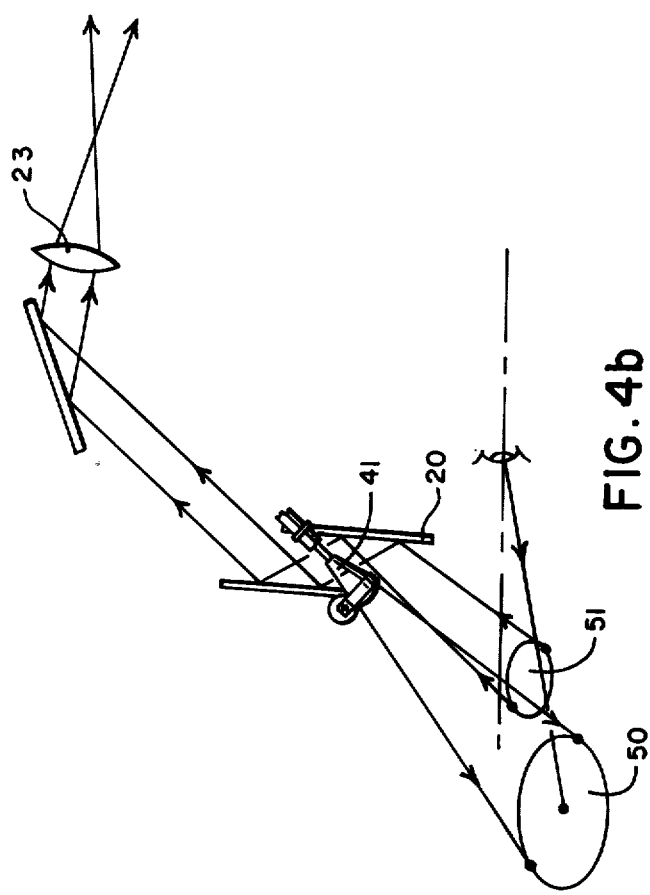
FIG. 4b is a simplified schematic optical diagram of the illumination and imaging optics of the illustrative embodiment; and, FIG. 5 is a prespective view of a remote control console in accordance with the illustrative embodiment.
Figure 4A:
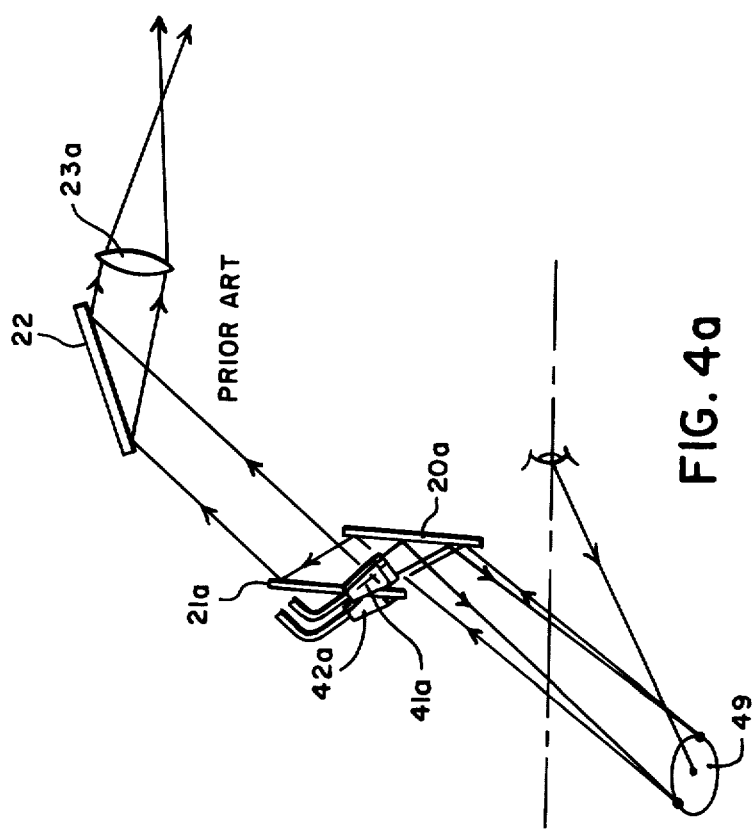
FIG. 4a is a simplified schematic optical diagram of the illumination and imaging optics of the prior art head attached unit.

The difference between the system of the present invention and that of the prior art is best illustrated by means of the optical schematic diagrams of FIGS. 4a and 4b. In the prior art system, the illuminator 41a and 42a were mounted such that at all times the light emitating therefrom was reflected off the mirror 20a rendering the location lighted 49 bore-sighted to the camera optical system through mirrors 21a and 22a and lens 23a. This resulted in coincidence of the camera field of view with the illuminator field of view at 49. Thus, the remote operator of the mirror 20a which controlled the field of view of the camera optical system was at all times simultaneaously in control of the position of the illuminated spot.

Because this control was left in the hands of the remote television camera operator, the surgeon or other wearer of the head-attached television system, was constantly subjected to lighting shifts at the whim of the remote operator who many times sought to see something different from what the wearer then wanted illuminated. It has been found that wearers of the head-attached unit such as surgeons who are long accustomed to wearing conventional headband attached lights during surgery tend to steer the light field to suit their particular needs which may or may not agree with the particular field of view sought by remote cameraman. Therefore, as the surgeon rotates or nods his head slightly to adjust the light to the particular field of view he seeks, the remote operator is simultaneously steering the light field by remotely controlling the orientation of the mirror 20a to center the activity of interest on his particular desired field of view. This of course results in constant conflicts between the wearer and the remote camera operator. The surgeon unconsciously, automatically steers the light in the direction he desires until no more motion of the mirror 20a is possible whereupon he can put the illumination field where he chooses; however, he will probably have to hold his head at an unusual and/or uncomfortable angle. The remote controller then is unable to properly center the action in the camera field of view which he desires.

FIG. 4b illustrates the independence of the field of view of the illuminator 50 and that controlled by the remote TV camera operator 51 in accordance with the present invention. Once the elevation and particular desired convergence or divergence have been adjusted by the surgeon or other head-attached television system wearer the location of the illuminated field of view is then completely controlled by the wearer and will follow his head movement precisely thereby eliminating the conflict between the wearer and the remote television camera operator.

Figure 5:
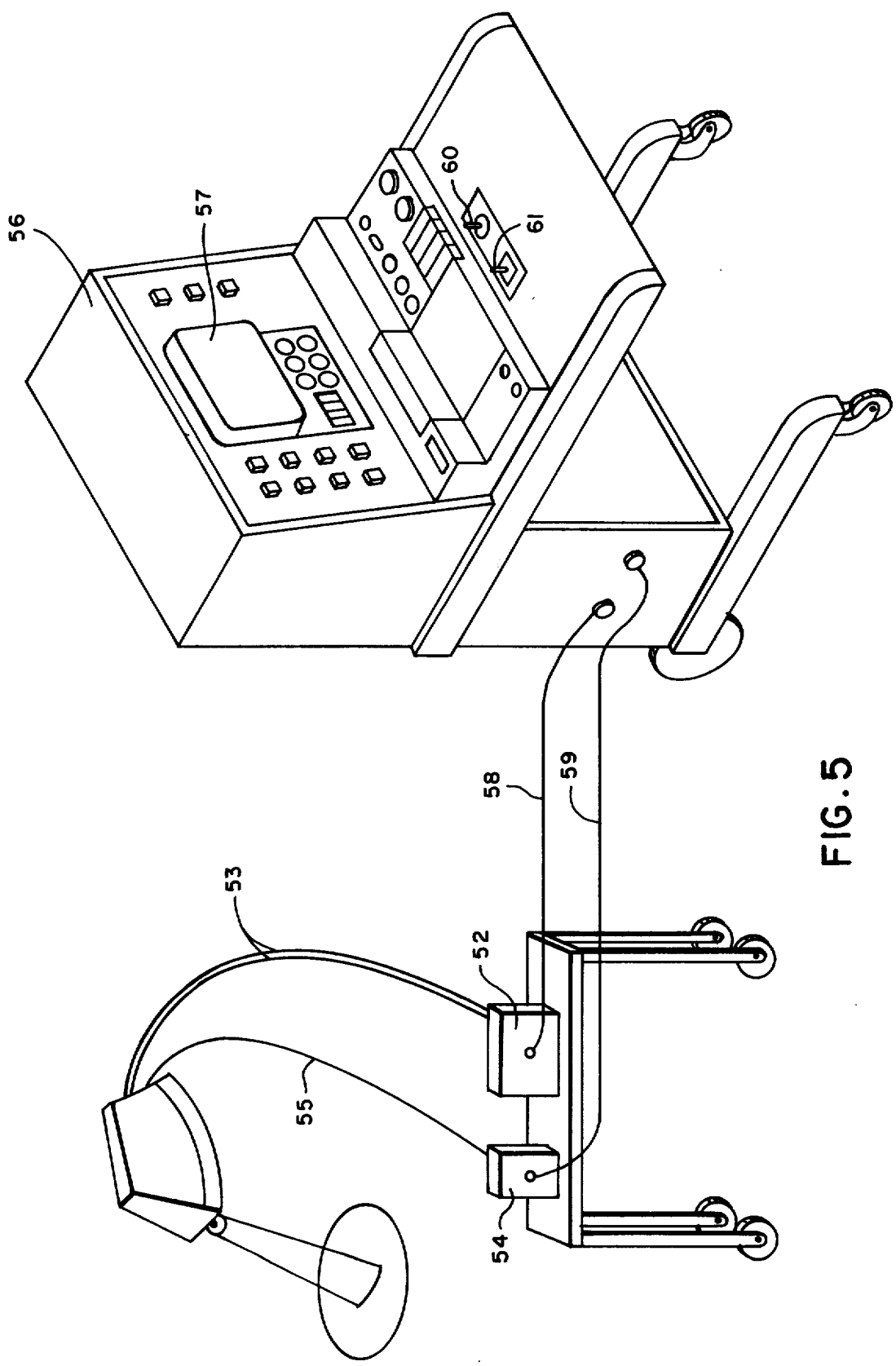

The light energy transmitted by the illumination optics subassemblies 41 and 42 may be provided by a source such as conventional low-voltage quartz halogen lamp shown in block form at 52 in FIG. 5. The light energy from the lamp is then transmitted to the head-mounted unit as by means of conventional flexible fiber optic bundles, indicated at 53 which separate to feed separate illumination subassemblies 41 and 42 (FIGS. 2a and 2b). The illumination brightness may be made adjustable in a conventional manner by providing an adjustment knob at the source 52. One successful illuminating system utilizes a 150 watt quartz halogen lamp, available from the General Electric Company, Schenectady, N.Y., and two fiber optic bundles manufactured by the American Optical Company of Sturbridge, Mass.

While no particular spot size is necessary for the two illuminators 41 and 42, it has been found that when they are operated in a slightly defocused manner the best shadowless illumination is achieved. Although the fixed illuminators of the prior art did provide adequate illumination for operation of the color TV camera and provided a spot of light for aiming the TV camera, it has been found that they did not always meet the needs of the wearer. In some cases such as abdominal surgery, external high intensity illumination was externally provided but in many cases involving oral, neuro and opthalmic procedures, the operator wanted to use head mounted illumination but needed a capability to adjust the spot size as well as the convergence distance of the two illumination beams. The nominal design of the illumination subassemblies is such that they produce spots of light about four inches in diameter at a working distance of approximately 18 inches. It may be appreciated that this can also be readily rendered mechanically adjustable so that the spot size can be increased or decreased at a given working distance.

The color television camera sub-system normally includes video and audio inputs. One-inch, single tube vidicon models available as from Magnavox Corporation (Model CV-400), Cohu Corporation (Model 12120) and others may be used. These are normally modified in form as described below. The above-type camera provides components for a lightweight small head-mounted unit consisting of the single vidicon and yoke, video per-amplifiers and an audio transducer (capacitor microphone) to provide the initial television and audio input in a well-known manner. A miniature speaker or speakers may be added to provide two-way audio communication between the wearer and remote operator or viewer(s). Because sweep amplifier and some other vidicon control circuits must be located close to the camera tube in order to function properly, a conventional support unit which is shown in block form at 54 (FIG. 5) is connected at fairly close range to the head-mounted camera as by a flexible conduit 55.

The bulk of the color television camera electronics and controls are located in the control sonsole 56 as illustrated in FIG. 5. That unit may be located remotely from the remainder of the system and contains all the controls for operating the remote focusing and aiming and also the controls for a remote video monitor 57 with its associated controls and a conventional audio monitor (not shown). Such other things as tape recorder control, etc. which are conventional additions to any such systems may also be used in conjunction with the monitor 57. The monitor 57 is connected remotely as through cables 58 and 59 with the illumination source 52 and camera-associated electronics 54, respectively. Both the console 56 and the support units 52 and 54 are shown as dolly-mounted for convenience in moving same. In a preferred finished version the units 49 and 51 are physically united to form a single unit which may be mounted on a standard hospital "IV" stand for convenience and minimum space utilization in a surgical operating room.

A single operator sitting at the console 56 then may manipulate a control such as joy stick 60 while viewing a real-time image of the field of view of the camera on the monitor 57 to aim the field of view of the camera to coincide with the field of view which he desires to capture. Some preliminary adjustments must also be made to align the camera axis to the wearers normal working field by a manual manipulations of the head-mounted unit on his head. A separate control as at 61 may be utilized to remotely adjust the focus of the camera also in response to the focus of the real-time image as seen by the operator on the monitor 72.

It can readily been seen that the present invention contemplates an improved illumination system for an apparatus for viewing intricate manual manipulations such as those performed by a surgeon utilizing a system which, unlike the previous systems allows the flexibility of the wearer's control of the field of view which is to be illuminated by the illuminators 41 and 42.

In addition to the system described above, of course, one or more stationary camera systems may be added to show, in a conventional manner, other views and depict certain other operations of the wearer or, if such additional camera work is required for any other reason. In such cases, additional monitors may be added to the console 56 corresponding to the additional cameras. Also, while the preferred embodiment utilizes a remote console unit certain applications where a less complex setup is required, a smaller portable unit may be employed.

It can be appreciated that advances in the rapidly changing electronics art can modify details of the color TV camera embodiment. In particular, use of new integrated circuits or solid state camera sensors may eliminate the need for any electronic unit such as 54. Also, use of the newest miniature quartz halogen lamps would permit their incorporation into the head-mounted unit thus eliminating the need for a separate illumination source, 52. pg,15

The embodiments of the invention in which an exclusive property or right is claimed are defined as follows:

1. In a remotely controlled head-mounted visual apparatus for viewing manual operations carried on by the wearer, said apparatus including camera means for generating signals representative of a visual image received, aiming and focusing means for said camera means, remote control means for controlling said aiming and focusing means, means for reconverting said signals to reproduce said visual image, means for transmitting said signals from said camera means to said means for reconverting, real-time viewing means for viewing said reconverted image, and mounting means for mounting said camera, aiming and focusing means on the head of said wearer, the improvement comprising:
   forward directed illumination means fixed on said head-mounted apparatus in a manner such that the location of the field lighted thereby is determined locally by the attitude of the head of said wearer.

2. The apparatus of claim 1 wherein said illumination means further comprises a pair of illuminators disposed so as to produce a combined single field of illumination.

3. The apparatus of claim 2 further comprising means for adjusting the convergence angle described by said pair of illuminators.

4. The apparatus of claim 1 further comprising means for adjusting the elevation of said illumination means relative to said head-mounted apparatus.

* * * * *